United States Patent
Bardzil et al.

(10) Patent No.: US 8,055,800 B1
(45) Date of Patent: Nov. 8, 2011

(54) ENFORCING HOST ROUTING SETTINGS ON A NETWORK DEVICE

(75) Inventors: Timothy J. Bardzil, San Jose, CA (US); Scott M. Hubbard, Santa Clara, CA (US)

(73) Assignee: Extreme Networks, Inc., Santa Clara, CA (US)

(*) Notice: Subject to any disclaimer, the term of this patent is extended or adjusted under 35 U.S.C. 154(b) by 520 days.

(21) Appl. No.: 11/772,003

(22) Filed: Jun. 29, 2007

(51) Int. Cl.
*G06F 15/16* (2006.01)
(52) U.S. Cl. ......... 709/248; 709/223; 709/238; 709/250
(58) Field of Classification Search ................... 709/248
See application file for complete search history.

(56) References Cited

U.S. PATENT DOCUMENTS

| | | | |
|---|---|---|---|
| 2004/0123150 A1* | 6/2004 | Wright et al. | 713/201 |
| 2004/0255154 A1* | 12/2004 | Kwan et al. | 713/201 |
| 2005/0055570 A1* | 3/2005 | Kwan et al. | 713/201 |
| 2007/0271360 A1* | 11/2007 | Sahita et al. | 709/223 |

* cited by examiner

*Primary Examiner* — Tammy Nguyen
*Assistant Examiner* — Natisha Cox
(74) *Attorney, Agent, or Firm* — Blakely Sokoloff Taylor & Zafman, LLP (57) ABSTRACT

A method and system for enforcing host routing settings in a network device comprises network devices having enforcement logic for extracting host routing settings from a DHCP packet issued by a DHCP server to a DHCP client connecting to a network. The network devices generate enforcement rules based on the host routing settings and apply those rules to ports through which the DHCP client connects to the network. The enforcement rules include access control lists having one or more match conditions generated based on the host routing settings.

18 Claims, 7 Drawing Sheets

ENFORCING HOST ROUTING SETTINGS ON A NETWORK DEVICE

TECHNICAL FIELD

The present invention relates to the field of computer networks and internetworking communications technologies. In particular, the present invention relates to network access control.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2007, Extreme Networks, Inc., All Rights Reserved.

BACKGROUND

Because networks have come under an increasing number of malicious attacks that not only compromise the security of network resources, but also prevent access by legitimate users, enforcement mechanisms to limit access to the network, i.e., network access control (NAC) mechanisms, have become an increasingly important part of network security. NAC mechanisms include host-based approaches to enforcement that limit access to the network by an end point device, i.e., the host, using network configuration information stored in the host itself, as well as network-based approaches to enforcement that limit the host's network access using network configuration information stored in the network's connection points, such as the switches, hubs, and routers, collectively referred to as switches.

A commonly used host-based approach to enforcement is the Dynamic Host Control Protocol (DHCP) for enforcing end point access policies through Internet Protocol (IP) address configuration. Examples of NAC solutions that implement DHCP include a NAC platform product sold under the trademark "Sentriant AG" by Extreme Networks, Inc., of Santa Clara, Calif., the assignee of the present application, as well as Microsoft's Network Access Protection ("NAP") framework.

Using DHCP, a DHCP server automatically assigns a DHCP client, i.e., the end point or host device, an IP address from an available pool of addresses, including various routing parameters such as a default gateway and subnet mask. The IP address and other parameters are leased to the end point device to allow access to the network for a predetermined period of time, after which the address assignment expires.

Unfortunately, the DHCP and other host-based approaches to enforcement have traditionally been very weak from a security perspective since enforcement is performed entirely on the host. In the case of DHCP, this allows an attacker to bypass the enforcement mechanism and gain full network access by simply configuring static networking settings on their machine rather than using the DHCP-provided settings, a practice that is sometimes referred to as IP spoofing.

For example, under normal circumstances, the DHCP server limits a non-compliant computer's access to the network by purposely not configuring a default gateway and/or setting the subnet mask to 255.255.255.255 so that there is no route to the attached subnet. The non-compliant computer may legitimately gain limited access to a domain name server (DNS) and remediation servers on the network only when the DHCP server assigns a limited set of host routes to those computers using the Classless Static Routes DHCP option. However, an attacker can bypass this entire mechanism by simply statically configuring a valid default gateway and IP subnet.

In order to thwart an attacker attempting to bypass the DHCP routing settings, some NAC solutions have implemented a network-based enforcement mechanism that locks down a suspect source IP address that does not appear to have been assigned by a DHCP server. Network-based approaches to enforcement are generally considered to be far more secure than host-based approaches such as DHCP since they are far more difficult for an attacker to bypass. This is because it is generally much harder for an attacker to reconfigure the network settings on a switch or other type of connection point than to reconfigure their own device.

One example of such a network-based enforcement mechanism is an IP security feature of the switch operating system sold under the trademark "Extreme XOS" by Extreme Networks, Inc., of Santa Clara, Calif., the assignee of the present application. The Source IP Lockdown feature automatically places source IP address filters on specified ports of a switch such that only traffic from a valid DHCP-assigned source IP address or an authenticated static source IP address is allowed to enter the network. In this way, the network is protected from attacks that use random source IP addresses for their traffic. However, because this feature is limited to filtering traffic based on the source IP address alone, it does not protect the network from attacks that bypass the other routing settings that are provided by DHCP, such as the default gateway and IP subnet settings.

SUMMARY

Embodiments of the present invention include a method and system for enforcing host routing settings on a network switch by placing filters on specified ports such that only traffic to specific destination addresses is permitted. The host routing settings include at least one of a default gateway and a classless static route, and are provided to a DHCP client from a DHCP server.

According to one aspect of the invention, placing filters on specified ports is performed by generating and applying a rule that governs packet filtering and forwarding decisions on traffic traversing the switch based on the host routing settings.

According to one aspect of the invention, prior to applying the rule based on the host routing settings, a blanket default rule is applied to the switch to block all traffic on a specified port except for DHCP packets. The specified port includes any port connected to a DHCP client. In this manner, the default enforcement action is to block all traffic on the specified port unless subsequently modified by the generation and application of rules enforcing the host routing settings received and assigned via the DHCP packets.

According to one aspect of the invention, upon receipt of a DHCP acknowledgement (ACK) packet indicating that a DHCP client is connecting to the network, the switch inspects the DHCP ACK packet and applies the rule to the specified port based for a single source IP address as identified by the source IP address assigned from the DHCP server, i.e. the source IP address contained in the host routing settings of the DHCP ACK packet, or by the MAC address of the DHCP client, or a combination of the two.

According to one aspect of the invention, when the host routing settings contained in the packet includes a default gateway, a rule based on the host routing settings is applied to the specified port to permit traffic matching the source IP address or the MAC address, or both, to be routed to the configured default gateway. When no default gateway has been configured, then the blanket default rule remains in effect, and blocks all traffic that might otherwise have been routed to a default gateway.

According to one aspect of the invention, when the host routing settings includes a classless static route, a rule based on the host routing settings is applied to the specified port to permit traffic matching the source IP address or the MAC address, or both, and bound for a destination IP address that falls within the classless IP subnet described by the classless static route. In a typical embodiment there may be more than one classless static route provided by the DHCP server, in which case a rule may be generated for each classless static route that is provided. When no classless static routes have been provided, the blanket default rule remains in effect, and blocks all traffic.

According to one aspect of the invention, the rules based on the host routing settings may be in the format of an access control list (ACL) that specifies one or more conditions to which a packet traversing the switch is compared, as well as an action to either permit or block (deny) traffic that matches the condition(s).

According to one aspect of the invention, generating the rules based on the host routing settings may be performed locally on the switch having the specified ports to which a DHCP client is connected. In some cases, however, the rules may be generated remotely on another switch, or other type of network device, and then transmitted to the local switch using a signaling protocol that causes the rule to be applied to the specified ports to which the DHCP client is connected. In this manner only selected switches in the network need be equipped with the logic to inspect the DHCP ACK packets and generate the corresponding enforcement rules, but any switch may enforce the rule in accordance with an embodiment of the invention.

In addition to the aspects and advantages of the present invention described in this summary, further aspects and advantages of the invention will become apparent to one skilled in the art to which the invention pertains from a review of the detailed description that follows, including aspects and advantages of an apparatus to carry out the above-described method and system for enforcing host routing settings on a network switch.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method and system to enforce host routing settings in a network device, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method, system and apparatus is implemented in a router, bridge, server or gateway, or as a software routine, hardware circuit, firmware, or a combination thereof.

Parts of the description will be presented using terminology commonly employed by those skilled in the art to convey the substance of their work to others skilled in the art, including terms of operations performed by a computer system, switch, or other network device, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

Figure 1:
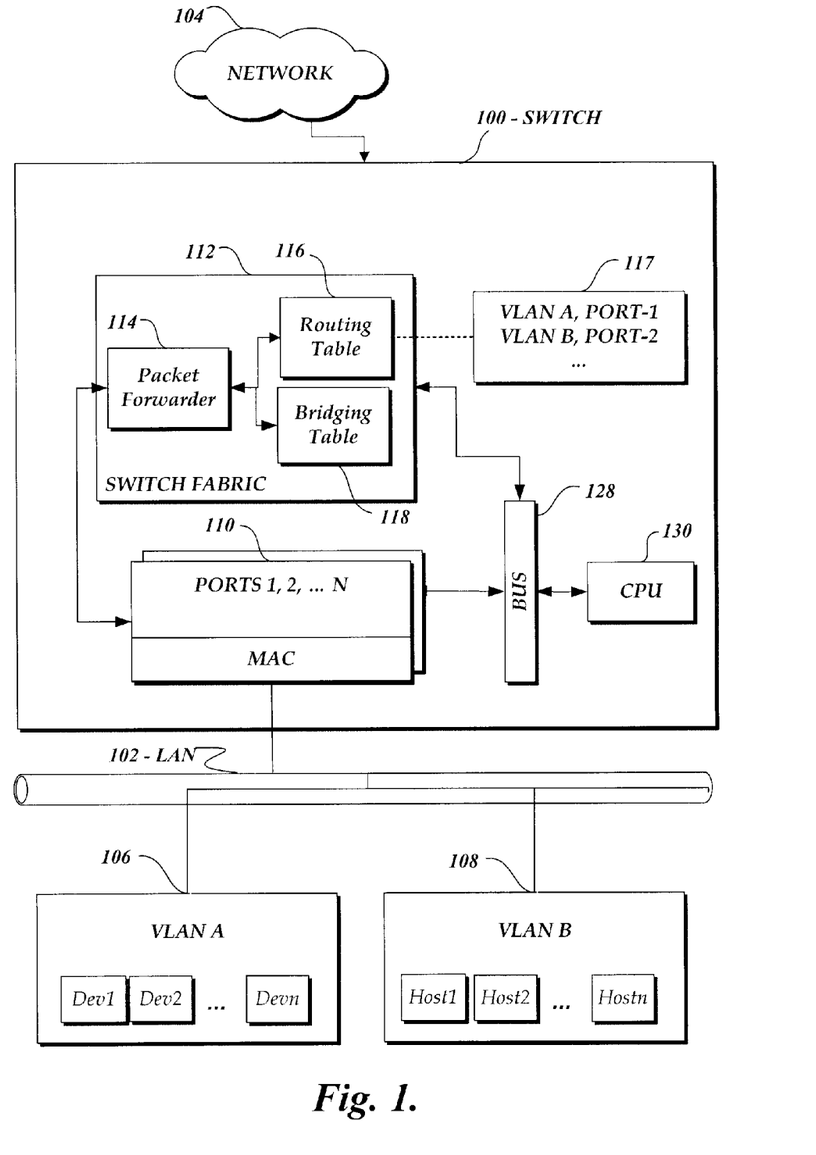
FIG. 1 is a block diagram illustrating certain aspects of a switch in a Local Area Network (LAN), an example of an operating environment in which the invention may be practiced.

FIG. 1 is a block diagram illustrating certain aspects of a switch in a Local Area Network (LAN), and serves as an example of an operating environment in which the invention may be practiced. A network device 100 functioning as a connecting device, such as a switch, router, or hub, collectively referred to herein as a switch, connects a local area network LAN 102 serving virtual LANs (VLAN) VLANA 106 and VLANB 108 to inter-network 104. The switch 100 comprises several ports, including the illustrated ports 110 numbered "1," "2," and so forth, each having a Media Access Control MAC chip 111 or similar component to connect the port 110 to LAN 102. The switch 100 further comprises a switch fabric 112 that typically includes, among other components, a bus 128, a central processing unit (CPU) 130, a packet forwarder 114, a routing table 116, a bridging table 118, and a port description table 117 for carrying out packet-forwarding operations on behalf of the devices and hosts connected to the LAN and VLANs.

Figure 2:
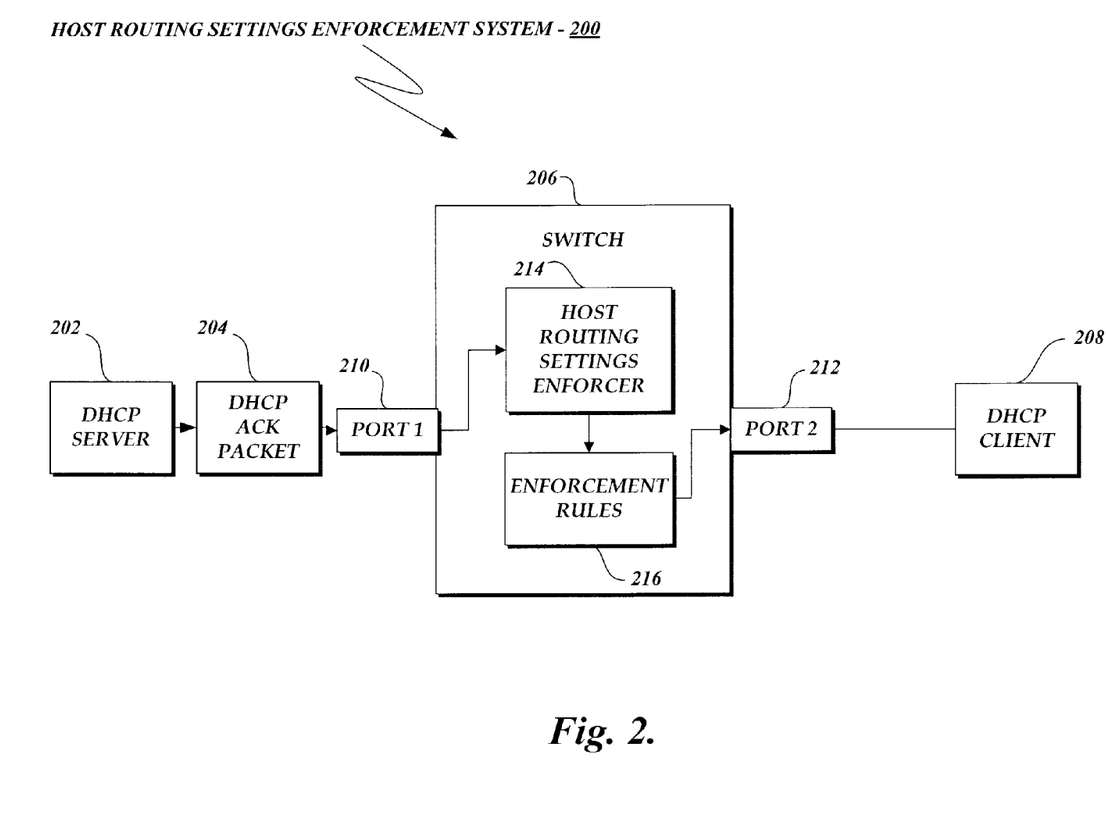
FIG. 2 is a block diagram illustrating certain aspects of a host routing settings enforcement system in which a method and system to enforce host routing settings in a network device may be practiced, including a switch that enforces rules generated by a host routing settings enforcer logic based on host routing settings obtained from a DHCP ACK packet, in accordance with an embodiment of the invention.

FIG. 2 is a block diagram illustrating certain aspects of a host routing settings enforcement system 200 in which a method and system to enforce host routing settings in a network device may be practiced, including a switch 206 incorporating various components for enforcing host routing settings in the switch in accordance with an embodiment of the invention. In a typical embodiment, the host routing settings enforcement system 200 is an alternative to a port-based network access control (NAC) system implemented on the LAN 202, such as port-based NAC implemented using the IEEE 802.1X standard.

In a typical embodiment, the host routing settings enforcement system 200 operates in conjunction with host-based NAC implemented with a DHCP server 202 that assigns a DHCP client 208 an IP address from an available pool of addresses as well as various host routing settings include a default gateway, subnet mask, and one or more classless static routes that comprise a set of host routes to selected destinations that the host is authorized to access, for example, a domain name server (DNS) and one or more remediation servers, or a database server, such as a human resources database that only authorized employees are allowed to access. The IP address and host routing settings are leased to the DHCP client 208 to allow access to the network for a predetermined period of time, after which the assignment expires.

The switch 206 incorporates enforcement logic illustrated in FIG. 2 as a host routing settings enforcer 214 that is responsible for obtaining the host routing settings that are assigned by the DHCP server 202 to the DHCP client 208. In a typical embodiment, the host routing settings are obtained by inspecting the DHCP ACK packet 204 that the DHCP server 202 sends to the DHCP client 208 when initiating the assignment of a leased IP address and any associated host routing parameters. The host routing settings enforcer 214 logic extracts the host routing settings information when the DHCP ACK packet 204 is received on the DHCP server port, PORT 1, 210. Also extracted are the source IP address assigned to the DHCP client, as well as the MAC address associated with the DHCP client. The host routing settings enforcer 214 logic uses the extracted information to generate one or more enforcement rules 216 that will operate to enforce the DHCP client's host routing settings whenever the DHCP client 208 attempts to send a network packet via the port through which the DHCP client is connected to the network, illustrated in FIG. 2, for example, as PORT 2, 212.

Figure 3:
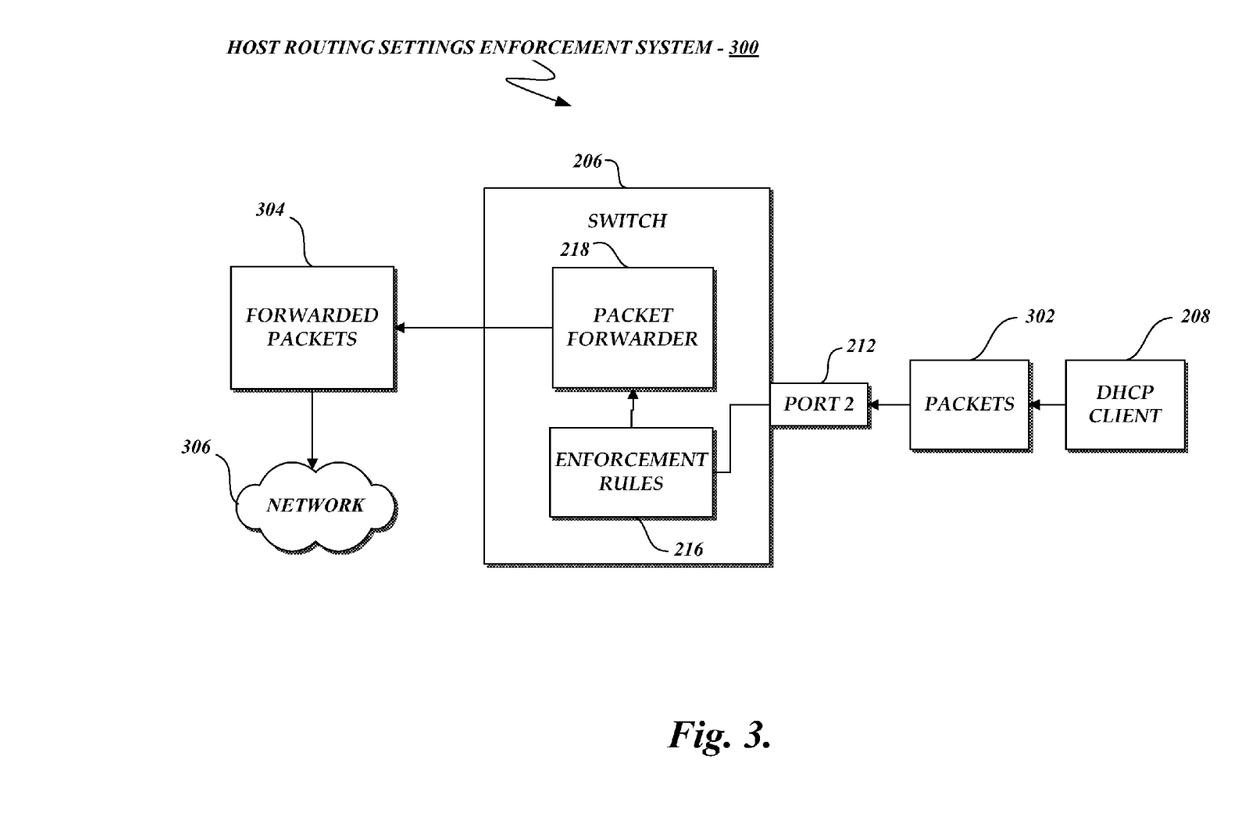
FIG. 3 is a block diagram illustrating certain aspects of a host routing settings enforcement system in which packets from a DHCP client are forwarded by a switch in accordance with an embodiment of the invention.

FIG. 3 is a block diagram illustrating certain aspects of a host routing settings enforcement system 300 in which a method and system to enforce host routing settings in a network device may be practiced, including the switch 206 described in FIG. 2 that incorporates various components for enforcing host routing settings in accordance with an embodiment of the invention. During operation, the host routing settings enforcement system 300 receives packets 302 from a DHCP client 208 for which enforcement rules 216 have been generated. The packets 302 are forwarded by a packet forwarder 218 component in the switch 206 in accordance with the enforcement rules 216 that were generated from a DHCP ACK packet 204 (FIG. 2) at the time the DHCP client 208 was assigned the leased IP address and host routing settings. Typically, the forwarded packets 304 are those packets 302 that are permitted to be forwarded according to the enforcement rules 216, and include packets whose source IP address or MAC address, or both, match the source IP address and MAC address that were generated for the rule 216, and are bound for a destination IP address routed to a configured default gateway, or bound for a destination IP address that falls within the classless IP subnet described by the classless static routes generated for the rule 216. Those packets 302 that do not follow the enforcement rules are typically discarded, i.e., dropped, and/or reported to a log maintained by the switch 206. In this manner, the limited network access initially granted by the DHCP server 202 to the DHCP client 208 allowing connectivity only to specific destination addresses is enforced by the network device, i.e., the switch 206.

Figure 4:
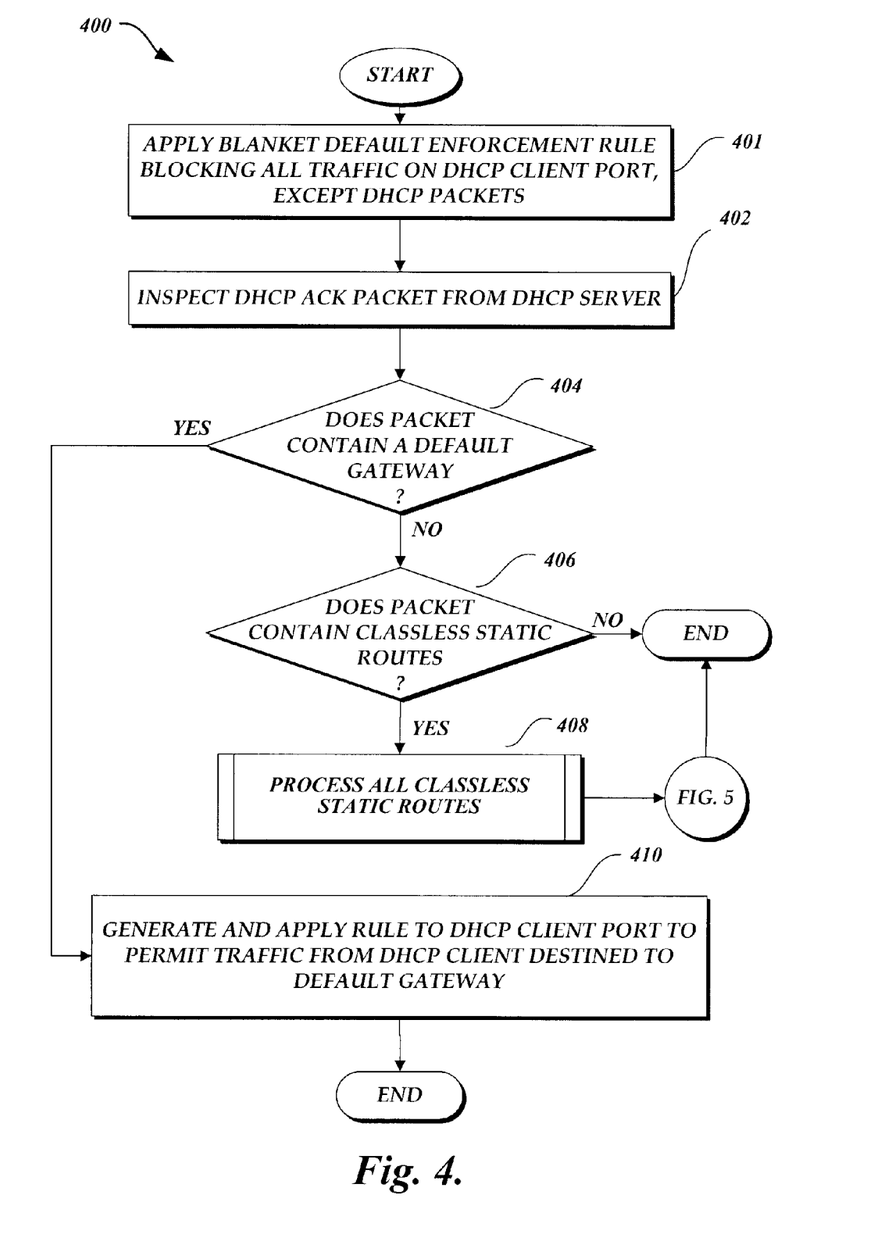
FIG. 4 is a flow diagram illustrating certain aspects of a method to be performed to enforce host routing settings in a network device in accordance with an embodiment of the invention.

FIG. 4 is a flow diagram illustrating certain aspects of a method 400 to be performed to enforce host routing settings in a network device in accordance with an embodiment of the invention. At block 401, the host settings enforcement logic is enabled on a port accepting connections from potential DHCP clients, causing the switch to apply a blanket default rule that blocks all traffic on the port except for DHCP packets. In one embodiment, at block 402, the method 400 inspects a DHCP ACK packet sent from a DHCP server for assigning a source IP address to a DHCP client and optionally providing other host routing settings. At decision block 404, the method 400 determines whether the DHCP ACK packet contains a default gateway configuration for the DHCP client. The default gateway is typically specified in the DHCP protocol using DHCP Option 3, the Router Option, as described in RFC 2132 DHCP Options and BOOTP Vendor Extensions, 1997. If a default gateway has been provided in the DHCP ACK packet, then the method 400 branches to block 410 and generates and applies an enforcement rule to the corresponding DHCP client's connecting port to permit traffic to be routed to the configured default gateway from the DHCP client. In a typical embodiment, the enforcement rule is generated as an access control list (ACL) in which the source IP address that was extracted from the DHCP ACK packet and the MAC address associated with the DHCP client are specified as ACL match conditions, along with setting the ACL destination match condition to the value "0.0.0.0/0," and the ACL action to "permit." The resulting rule permits packets from the DHCP client to be routed to the configured default gateway that was assigned by the DHCP server.

In one embodiment, if no default gateway configuration for the DHCP client has been provided, then the blanket default rule applied at block 401 remains in effect, and will block all traffic on the port. The method 400 continues at decision block 406 to determine whether limited access should be permitted by determining whether the DHCP ACK packet specifies one or more classless static routes that might at least provide the DHCP client limited access to certain remediation servers, application servers, database servers, and the like, that the DHCP client is authorized to access. The classless static routes are typically specified in the DHCP protocol using DHCP Option 121, the Classless Static Routes Option, as documented by the Internet Assigned Numbers Authority in the web page published at the web address http://www.iana.org/assignments/bootp-dhcp-parameters. If classless static routes have been specified, then at block 408 the method branches to logic illustrated in FIG. 5 to process all the classless static routes in accordance with an embodiment of the invention. Otherwise, the method 400 ends the inspection and processing of the DHCP ACK packet. As a result, the blanket default rule remains in effect, and blocks all traffic.

Figure 5:
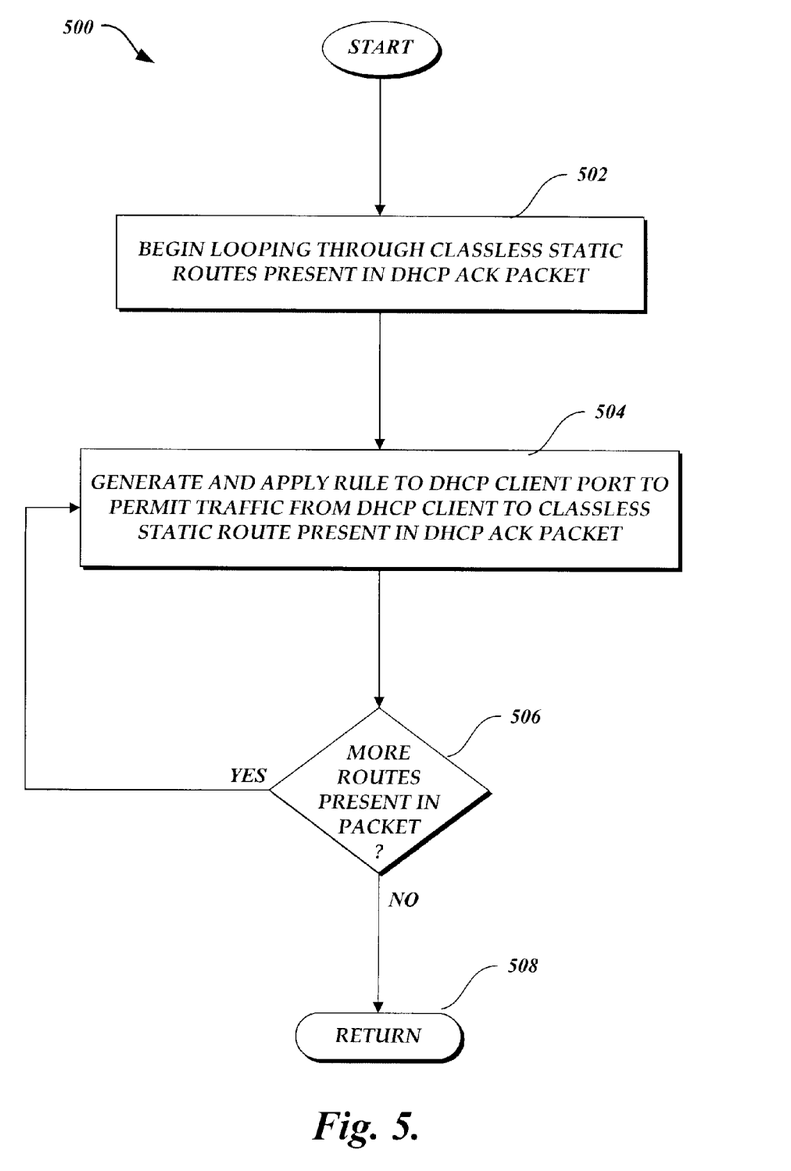
FIG. 5 is a flow diagram illustrating certain other aspects of a method to be performed to enforce host routing settings in a network device in accordance with an embodiment of the invention.

FIG. 5 is a flow diagram illustrating certain aspects of a method 500 to be performed to enforce host routing settings in a network device in accordance with an embodiment of the invention. In one embodiment, at block 502 the method 500 begins looping through each classless static route present in the DHCP ACK packet. For each classless static route that is specified, at block 504, the method 500 generates and applies a rule to the port through which the DHCP Client is connecting to the network that will permit packets from the DHCP Client that are destined for that classless static route. In a typical embodiment, the enforcement rule is generated as an ACL in which the source IP address that was extracted from the DHCP ACK packet and the MAC address associated with the DHCP Client are specified as ACL match conditions, along with setting the ACL destination match condition to the value of the specified classless static route, and the ACL action to "permit." The resulting rule permits forwarding packets from the DHCP Client that are bound for a destination address that falls within the classless IP subnet described by the classless static route(s) that are assigned by the DHCP server. At decision block 506, the method continues by inspecting the DHCP ACK packet to determine whether additional classless static routes are specified, and if so, branches back to block 504 to process each route. When all of the routes have been processed, then the method 500 returns 508 to the processing logic illustrated in FIG. 4 and ends the inspection and processing of the DHCP ACK packet.

Figure 6:
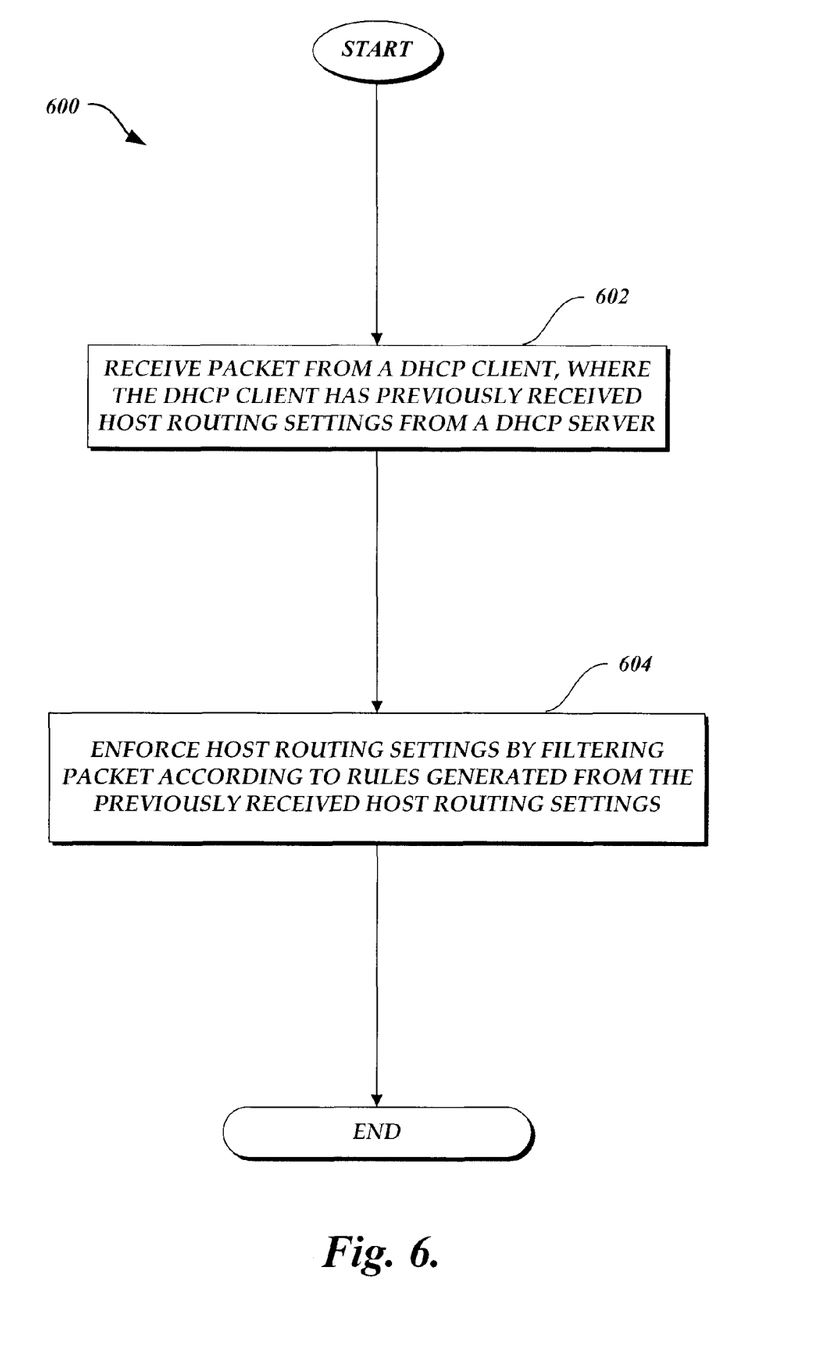
FIG. 6 is a flow diagram illustrating certain other aspects of a method to be performed to enforce host routing settings in a network device in accordance with an embodiment of the invention.

FIG. 6 is a flow diagram illustrating certain other aspects of a method to be performed to enforce host routing settings in a network device in accordance with an embodiment of the invention. In particular, FIG. 6 illustrates an overview of the enforcement of host routing settings after the enforcement rules have been generated and applied to the specified ports through which the DHCP clients are connected to the network, as described in FIGS. 4 and 5. At block 602, the method 600 receives an incoming packet from a DHCP client on a port residing on a switch in which host routing settings enforcement logic has been activated or otherwise enabled in accordance with an embodiment of the invention. In a typical embodiment, the DHCP client has previously received an assignment of host routing settings from a DHCP server. At block 604, the method 600 enforces the host routing settings that were previously received and assigned to the DHCP client by filtering the incoming packet according to the blanket default enforcement rule and any subsequent enforcement rules generated from the previously received and assigned host routing settings.

Figure 7:
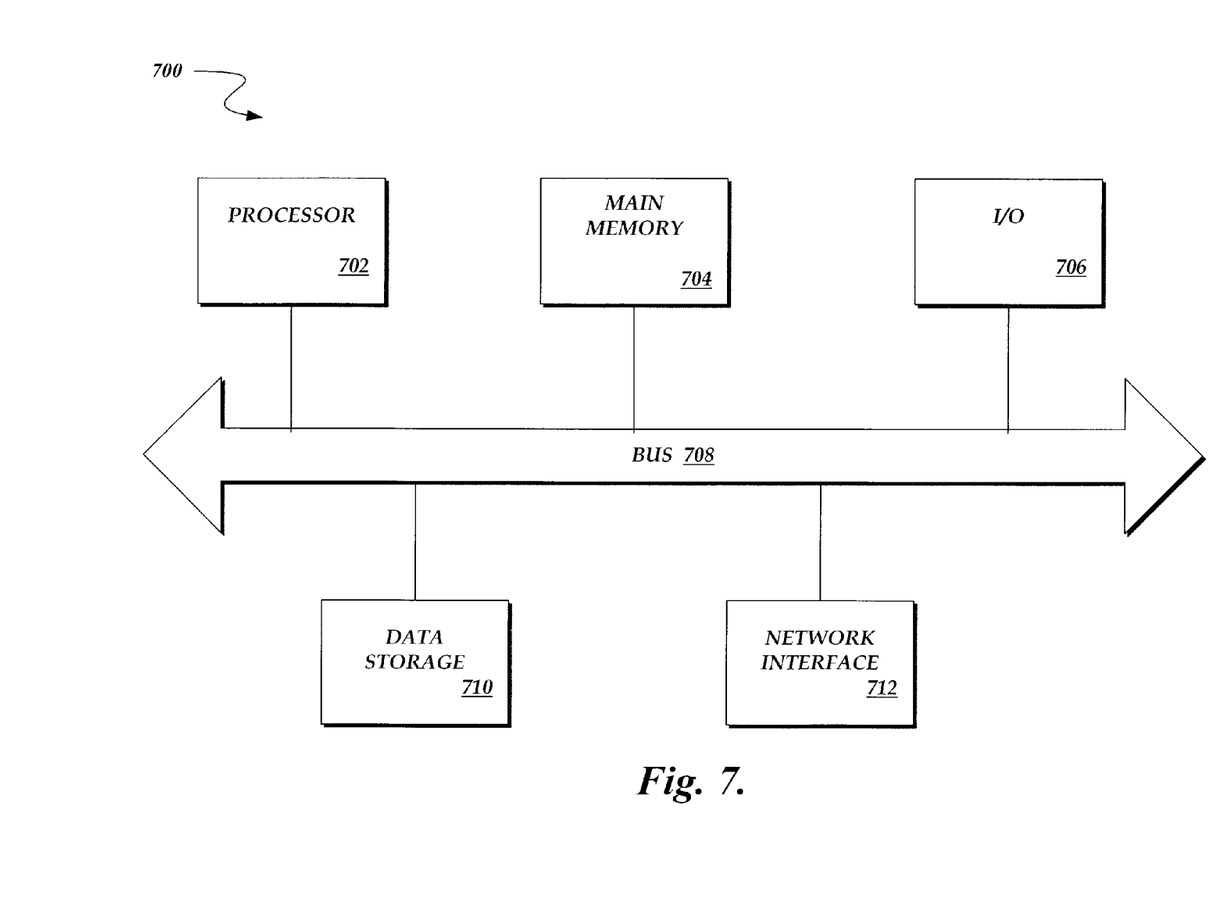
FIG. 7 illustrates one embodiment of a suitable computing environment in which certain aspects of the invention illustrated in FIGS. 2-6 may be practiced.

FIG. 7 illustrates one embodiment of a suitable computing environment in which certain aspects of the invention illustrated in FIGS. 1-6 may be practiced. In one embodiment, the method and system to enforce host routing settings in a network device in accordance with an embodiment of the invention may be implemented on a computer system 700 having components 702-712, including a processor 702, a memory 704, an Input/Output device 706 a data storage 710, and a network interface 712, coupled to each other via a bus 708. The components perform their conventional functions known in the art and provide the means for implementing the host routing settings enforcement system 200/300 and methods 400/500/600 described and illustrated in FIGS. 2-6. Collectively, these components represent a broad category of hardware systems, including but not limited to general purpose computer systems, servers, switches, routers, hubs and other specialized packet-forwarding devices.

In one embodiment, the memory component 704 may include one or more of random access memory (RAM), and nonvolatile storage devices (e.g., magnetic or optical disks) on which are stored instructions and data for use by processor 702, including the instructions and data that comprise the enforcement rules 216, and the various functions embodied in logic of the host routing settings enforcer 214 on the switch 206. The data storage component 710 may also represent the instructions and data that comprise the enforcement rules 216, and the various functions embodied in logic of the host routing settings enforcer 214 on the switch 206. In one embodiment, the network interface component 712 may include the ports 210/212 on the switch 206.

It is to be appreciated that various components of computer system 700 may be rearranged, and that certain implementations of the present invention may not require nor include all of the above components. Furthermore, additional components may be included in system 700, such as additional processors (e.g., a digital signal processor), storage devices, memories, network/communication interfaces, etc.

In the illustrated embodiment of FIG. 7, method and system to enforce host routing settings in accordance with an embodiment of the invention as discussed above may be implemented as a series of software routines executed by computer system 700. The software routines may comprise a plurality or series of instructions, code sequences, configuration information, or other data to be accessed and/or executed by a processing system such as one or more of processor 702. Initially, the series of instructions, code sequences, configuration information, or other data may be stored on data storage 710 and transferred to memory 704 via bus 708.

It is to be appreciated that the series of instructions, code sequences, configuration information, or other data can be stored a data storage 710 using any computer-readable or machine-accessible storage medium, such as a diskette, CD-ROM, magnetic tape, DVD, ROM, etc. It is also to be appreciated that the series of instructions, code sequences, configuration information, or other data need not be stored locally, and could be stored on a remote storage device, such as a server or other network device on a network, and received on the system 700 via a network/communication interface 1012. The instructions, code sequences, configuration information, or other data may be copied from the data storage 710, such as mass storage, or from the remote storage device into memory 704 and accessed and executed by processor 702.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for enforcing host routing settings in a network device in accordance with an embodiment of the invention. From the foregoing description, those skilled in the art will recognize that many other variations of the present invention are possible. In particular, while the present invention has been described as being implemented in a network environment comprising one or more switches 100 connecting a LAN 102 and a network 104, some of the logic may be distributed in other components of a network or inter-network application. Thus, the present invention is not limited by the details described. Instead, the present invention can be practiced with modifications and alterations within the spirit and scope of the appended claims.

What is claimed is:

1. A method for enforcing DHCP host routing settings in a network device, the method comprising:

placing a first filter on a port through which a DHCP client connects to a network, the first filter blocking all traffic except traffic containing DHCP packets;

obtaining a DHCP host routing setting from a DHCP packet issued by a DHCP server to a DHCP client connected to the network, the DHCP host routing setting including information for configuring authorized routes through which the DHCP client is to be permitted access to the network, the host routing setting including at least one of a default gateway and a classless static route;

generating enforcement rules to enforce the DHCP host routing setting obtained from the DHCP packet;

wherein generating enforcement rules to enforce the DHCP host routing setting includes:

determining that the DHCP host routing setting obtained from the DHCP packet is the classless static route;

generating a classless static route enforcement rule to provide the DHCP client limited access to network resources in the absence of host routing settings that permit greater access to network resources;

placing a second filter on the port through which the DHCP client is connected to the network, the second filter permitting traffic based on enforcement rules generated to enforce the DHCP host routing setting obtained from the DHCP packet;

wherein the second filter permits traffic to be routed to a destination falling within a classless IP subnet described by the classless static route specified in the DHCP host routing setting in accordance with the generated classless static route enforcement rule.

2. The method of claim 1, wherein generating enforcement rules to enforce the DHCP host routing setting includes:

determining that the DHCP host routing setting obtained from the DHCP packet is a default gateway;

generating a default gateway enforcement rule to permit traffic to be routed to the default gateway from the DHCP client over the port through which the DHCP client connects to the network; and further wherein the second filter permits traffic to be routed to the default gateway configured in the DHCP host routing setting in accordance with the generated default gateway enforcement rule.

3. The method of claim 1, wherein the classless static route specified in the DHCP host routing setting is an authorized route to a device that the DHCP client is permitted to access.

4. The method of claim 3, wherein the device that the DHCP client is permitted to access is any one of a domain name server, a remediation server, an application server, and a file server.

5. The method of claim 1, wherein placing filters on the port in accordance with the generated enforcement rules is applying an access control list (ACL) to the port, the ACL having a match condition generated based on the DHCP host routing setting.

6. The method of claim 5, wherein the match condition generated based on the DHCP host routing setting comprises at least one of a source IP address assigned to the DHCP client, a MAC address associated with the DHCP client, and a destination set to "0.0.0.0/0," when the DHCP host routing settings contains a default gateway.

7. The method of claim 5, wherein the match condition generated based on the DHCP host routing setting comprises at least one of a source IP address assigned to the DHCP client, a MAC address associated with the DHCP client, and a destination set to a classless static route contained in the DHCP host routing setting.

8. A system to enforce DHCP host routing settings in a network device, the system comprising:

a switch coupled to a network, the switch having a port through which a DHCP client connects to the network;

a first filter placed on the port to block all traffic except for DHCP packets;

a DHCP packet received on the port, the DHCP packet containing DHCP host routing settings for the DHCP client, the DHCP host routing settings including information for configuring authorized routes through which the DHCP client is to be permitted access to the network, the host routing settings including at least one of a default gateway and a classless static route;

a processor accessible to the switch, the processor having control logic to generate enforcement rules to enforce the DHCP host routing setting obtained from the DHCP packet;

wherein generating enforcement rules to enforce the DHCP host routing setting includes:

determining that the DHCP host routing setting obtained from the DHCP packet is the classless static route;

generating a classless static route enforcement rule to provide the DHCP client limited access to network resources in the absence of host routing settings that permit greater access to network resources;

a second filter placed on the port to permit traffic based on the generated enforcement rules to enforce the DHCP host routing settings for the DHCP client contained in the DHCP packet received on the port;

wherein the second filter placed on the port permits traffic to be routed to a destination falling within a classless IP subnet described by the classless static route specified in the DHCP host routing setting in accordance with the control logic's generated classless static route enforcement rule.

9. The system of claim 8, wherein generating enforcement rules to enforce the DHCP host routing setting includes:

determining that the DHCP host routing setting contained in the DHCP packet received on the port is a default gateway;

the control logic generating a default gateway enforcement rule to permit traffic to be routed to the default gateway from the DHCP client over the port through which the DHCP client connects to the network; and further wherein the second filter placed on the port permits traffic to be routed to the default gateway configured in the DHCP host routing setting contained in the DHCP packet received on the port in accordance with the control logic's generated default gateway enforcement rule.

10. The system of claim 8, wherein the classless static route specified in the DHCP host routing setting describes an authorized route to a device that the DHCP client is permitted to access.

11. The system of claim 10, wherein the device that the DHCP client is permitted to access is any one of a domain name server, a remediation server, an application server, and a file server.

12. The system of claim 8, wherein the enforcement rules include an access control list (ACL), the ACL specifying a match condition generated based on the DHCP host routing setting.

13. The system of claim 12, wherein the processor is to generate the ACL specifying the match condition based on the DHCP host routing setting, including generating the ACL specifying at least one of a source IP address assigned to the DHCP client, a MAC address associated with the DHCP client, and a destination set to "0.0.0.0/0," when the DHCP host routing settings contains a default gateway.

14. The system of claim 12, wherein the processor is to generate the ACL specifying the match condition based on the DHCP host routing setting, including generating the ACL specifying at least one of a source IP address assigned to the DHCP client, a MAC address associated with the DHCP client, and a destination set to a classless static route contained in the DHCP host routing setting.

15. An article of manufacture comprising:
a non-transitory computer readable medium including instructions that, when executed on a network device in a network, cause the network device to:
block all traffic except traffic containing DHCP packets on a port through which a DHCP client is connected to a network;
determine a DHCP host routing setting on a DHCP packet issued by a DHCP server to the DHCP client connected to the network, the DHCP host routing settings including information for configuring authorized routes through which the DHCP client is to be permitted access to the network, the host routing setting including at least one of a default gateway and a classless static route;
generating enforcement rules to enforce the DHCP host routing setting determined from the DHCP packet;
wherein generating enforcement rules to enforce the DHCP host routing setting includes:
determining that the DHCP host routing setting obtained from the DHCP packet is the classless static route;
generating a classless static route enforcement rule to provide the DHCP client limited access to network resources in the absence of host routing settings that permit greater access to network resources;
applying the generated enforcement rules to the port through which the DHCP client is connected to the network; and
permit traffic on the port through which the DHCP client is connected to the network in accordance with the generated enforcement rules applied to the port based on the DHCP host routing setting determined from the DHCP packet;
wherein permitting traffic on the port includes:
permitting traffic to be routed to a destination falling within a classless IP subnet described by the classless static route specified in the DHCP host routing setting in accordance with the control logic's generated classless static route enforcement rule.

16. The article of manufacture of claim 15, wherein the instructions further cause the network device to:
permit traffic to be routed to a default gateway in accordance with the generated enforcement rules applied to the port, based on the default gateway specified in the DHCP host routing setting.

17. The article of manufacture of claim 15, wherein the instructions further cause the network device to:
permit traffic to be routed to a destination falling within a classless IP subnet described by a classless static route in accordance with the generated enforcement rules applied to the port, the classless static route as specified in the DHCP host routing setting.

18. The article of manufacture of claim 17, wherein the destination falling within the classless IP subnet described by the classless static route specified in the DHCP host routing setting is a destination to a device that the DHCP client is permitted to access.

* * * * *